(No Model.)

A. REID.
BAKING OVEN.

No. 287,962. Patented Nov. 6, 1883.

Witnesses:
Willie O. Stark
Al Stark

Inventor:
Adam Reid,
by Michael J. Stark,
Attorney.

UNITED STATES PATENT OFFICE.

ADAM REID, OF BUFFALO, NEW YORK.

BAKING-OVEN.

SPECIFICATION forming part of Letters Patent No. 287,962, dated November 6, 1883.

Application filed June 11, 1883. (No model.)

*To all whom it may concern:*

Be it known that I, ADAM REID, of Buffalo, in the county of Erie and State of New York, have invented certain new and useful Improvements on a Baking-Oven; and I do hereby declare that the following description of my said invention, taken in connection with the accompanying sheet of drawings, forms a full, clear, and exact specification, which will enable others skilled in the art to which it appertains to make and use the same.

My present invention has general reference to improvements in baking and roasting ovens; and it consists, essentially, in the novel and peculiar combination of parts and details of construction, as hereinafter first fully set forth and described, and then pointed out in the claim.

Figure 1:
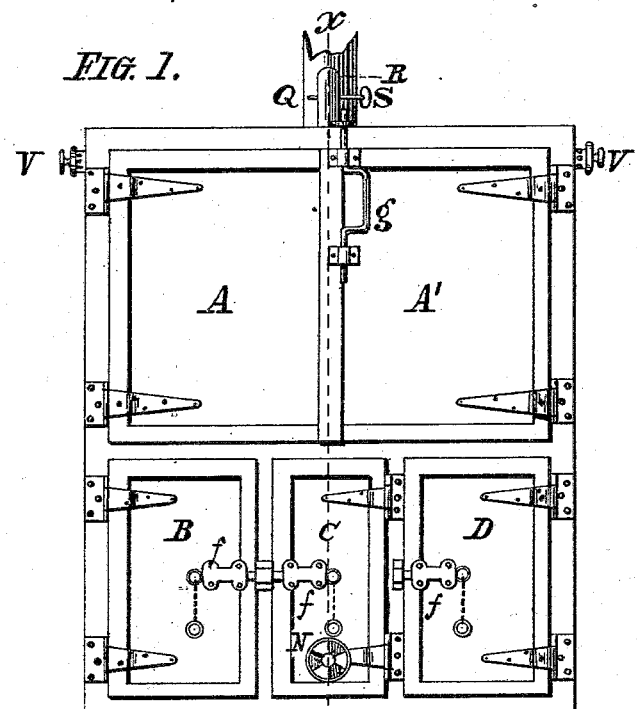
Figure 2:
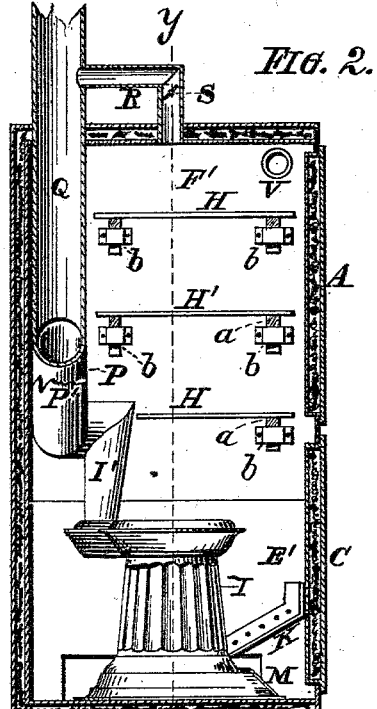
Figure 3:
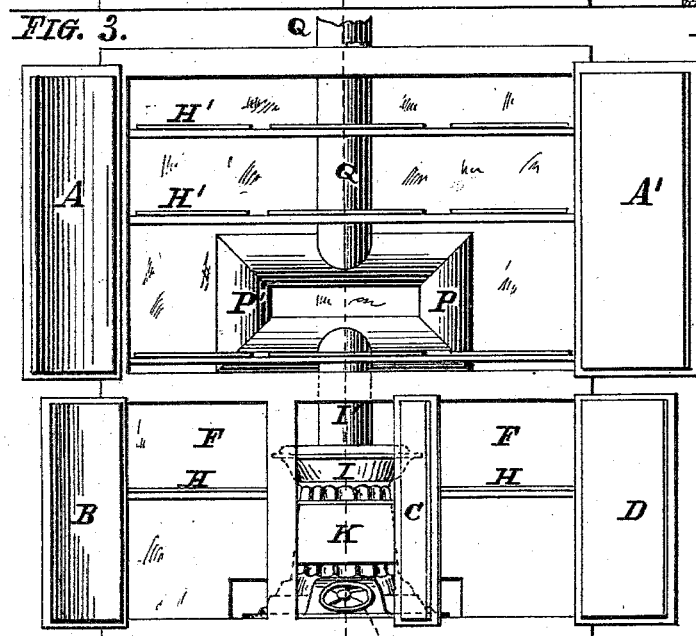
Figure 4:
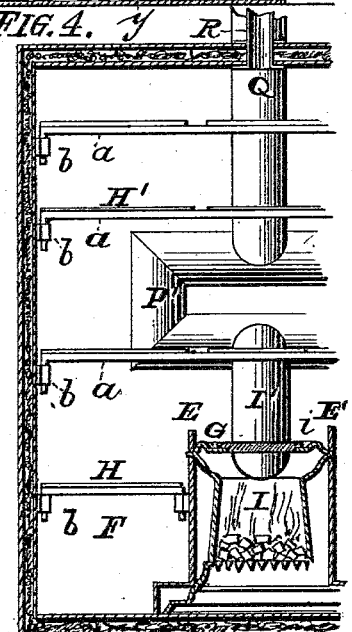

In the drawings already referred to, which serve to illustrate my present invention more fully, Figure 1 is a front elevation of my improved oven. Fig. 2 is a transverse sectional elevation in line $x\,x$ of Fig. 1. Fig. 3 is a front elevation, showing the doors of the oven open, so as to enable inspection of the interior arrangement. Fig. 4 is a longitudinal sectional elevation in line $y\,y$ of Fig. 2.

Like parts are designated by corresponding letters of reference in all the figures.

The object of my present invention is the production of an efficient baking-oven for the use of bakers, hotels, boarding-houses, and all other institutions where a large amount of flour is daily consumed, the principal object sought to be accomplished being the avoidance of all heat and unpleasant odors. To accomplish this result, I construct this oven substantially of rectangular form, in sheet metal, and make all the walls of the structure double, filling the spaces between the inner and outer sheets with a poor conductor of heat—such as mineral wool, asbestus, or other analogous non-combustable substance or material.

In the front wall of this apparatus I provide two upper doors, A A', and three lower doors, B, C, and D, respectively, by means of which access is had to any part of the interior of the oven. These doors are all double-walled and the space filled, the same as the side, &c., walls.

In the lower portion of the apparatus are two vertical partitions, E, Fig. 4, and E', Fig. 2, so as to divide this lower portion into three compartments, the two outer ones of which, F, are provided with shelves or racks H, while the central one, G, is fitted with a stove or other heating device, I, entirely within said compartment G. From this stove I leads an inclined partition or fender, K, so as to divide the compartment G into two portions, the one below said fender, L, leading to the register M of said stove I. A pipe, I', leading from the stove I, conveys the heated gases of combustion to a heating-pipe, P P', from whence these gases pass to the chimney or conducting-pipe Q, as clearly shown in the drawings.

From the upper portion, F', of the apparatus leads a waste or similar pipe, R, to the chimney Q, a damper, S, being placed into said pipe R to interrupt communication between said portion F' and the chimney Q whenever desired. In this chamber F' are placed a series of racks, trays, or similar receptacles, H', resting upon bars $a$, placed into loops $b$, secured to the side walls of the oven in any convenient and desirable manner.

In the upper portion of the compartment F' are two registers, V, to admit cold air to said compartment whenever desired. These registers consist of a cylindrical shell or tube having a series of perforations, as clearly indicated in Fig. 1, and they are constructed with a view to being slid into or pulled out of the side walls to establish or interrupt communication between the exterior and interior of the apparatus, as the case may be.

All the doors of the apparatus are fitted with suitable locking devices, $f\,g$, and the door C has, in addition to such locking device, a register, N, to admit air to the compartment L.

In operation, fire is started in the stove I in the usual manner, the filling being accomplished through the cover $i$, Fig. 4, and the proper supply of air to the fire regulated by the registers N and M. Bread and biscuit, &c., to be baked are placed into suitable pans, trays, &c., and then placed upon the racks H' and H. The heat of the stove and pipes within the compartments will soon effect the proper baking of these articles.

It will be readily observed that owing to the fact that all the walls of the apparatus are properly filled with a bad conductor of heat there is but very little, if any, heat conveyed to the outside sheets of the apparatus, thus preventing any loss thereof by radiation, and thereby, furthermore, avoiding any undue heating of the room into which the apparatus is placed.

It is perfectly obvious that instead of the heating-stove I, shown and described, any other heating apparatus may be used in this oven without departing from my invention, so long as the said heating apparatus is contained entirely within the said oven.

Having thus fully described my invention, I claim as new and desire to secure by Letters Patent of the United States—

The combination, with the double-walled structure having the compartments F F G, of the heater I, fender K, and register M, said heater being entirely within the compartment G and provided with a series of heating-pipes, P P', as stated.

In testimony that I claim the foregoing as my invention I have hereto set my hand in the presence of two subscribing witnesses.

ADAM REID.

Attest:
MICHAEL J. STARK,
JOHN C. DUERR.